(12) United States Patent
Zhang et al.

(10) Patent No.: US 11,598,987 B2
(45) Date of Patent: Mar. 7, 2023

(54) DISPLAY DEVICE

(71) Applicant: BOE TECHNOLOGY GROUP CO., LTD., Beijing (CN)

(72) Inventors: Qingxun Zhang, Beijing (CN); Qian Wang, Beijing (CN); Wenqing Zhao, Beijing (CN); Zhongxiao Li, Beijing (CN); Song Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/599,299

(22) PCT Filed: Feb. 24, 2021

(86) PCT No.: PCT/CN2021/077603
§ 371 (c)(1),
(2) Date: Sep. 28, 2021

(87) PCT Pub. No.: WO2021/169981
PCT Pub. Date: Sep. 2, 2021

(65) Prior Publication Data
US 2022/0155633 A1 May 19, 2022

(30) Foreign Application Priority Data
Feb. 27, 2020 (CN) .......................... 202010122380.1

(51) Int. Cl.
*G02F 1/1335* (2006.01)
*G02F 1/13357* (2006.01)
(Continued)

(52) U.S. Cl.
CPC .... *G02F 1/133512* (2013.01); *G02F 1/13362* (2013.01); *G02F 1/133553* (2013.01); *G02F 1/134309* (2013.01); *G02F 1/137* (2013.01)

(58) Field of Classification Search
None
See application file for complete search history.

(56) References Cited

U.S. PATENT DOCUMENTS 6,975,455 B1 * 12/2005 Kotchick ............... G02B 5/305
359/493.01
2018/0052365 A1 * 2/2018 Bae ....................... G02F 1/1362
(Continued)

FOREIGN PATENT DOCUMENTS

CN 101825802 A 9/2010
CN 107255885 A 10/2017
(Continued)

*Primary Examiner* — Ryan Crockett
(74) *Attorney, Agent, or Firm* — Houtteman Law LLC

(57) ABSTRACT

The present disclosure provides a display device including a liquid crystal layer having a first surface and a second surface opposite to each other, and the second surface has a light entrance region and a light outgoing region; a reflector within the liquid crystal layer and adjacent the first surface; a light absorbing layer on the first surface of the liquid crystal layer, the light absorbing layer including a first shielding layer, a second shielding layer and a filling layer therebetween, the second shielding layer is between the first shielding layer and the liquid crystal layer and has a first opening therein, and the liquid crystal layer is configured to modulate light incident from the light entrance region into first refracted light under a first voltage; and modulate the light incident from the light entrance region into second refracted light under a second voltage different from the first voltage.

14 Claims, 4 Drawing Sheets

(51) Int. Cl.
G02F 1/1343 (2006.01)
G02F 1/137 (2006.01)

(56) References Cited

U.S. PATENT DOCUMENTS

| | | | |
|---|---|---|---|
| 2019/0033656 A1* | 1/2019 | Tan | G02B 6/0031 |
| 2020/0379157 A1* | 12/2020 | Meng | G02B 5/0215 |
| 2022/0050343 A1* | 2/2022 | Wang | G09G 3/3406 |
| 2022/0308388 A1* | 9/2022 | Yue | G02F 1/133553 |

FOREIGN PATENT DOCUMENTS

| | | |
|---|---|---|
| CN | 110262119 A | 9/2019 |
| CN | 110673388 A | 1/2020 |
| CN | 111190306 A | 5/2020 |
| KR | 102093630 B1 | 3/2020 |

\* cited by examiner

DISPLAY DEVICE

CROSS REFERENCE TO RELATED APPLICATIONS

This is a National Phase Application filed under 35 U.S.C. 371 as a national stage of PCT/CN2021/077603, filed on Feb. 24, 2021, an application claiming the priority of the Chinese Patent Application No. 202010122380.1 filed on Feb. 27, 2020, the content of which is incorporated herein by reference in its entirety.

TECHNICAL FIELD

The present disclosure relates to the field of display technologies, in particular, to a display device.

BACKGROUND

In recent years, the field of the display technologies is vigorously developed, thin film transistor liquid crystal display devices (TFT-LCDs) currently occupy most of the market, and the display technologies such as Organic Light Emitting Diodes (OLEDs), mini OLEDs, and micro OLEDs also highlight their respective advantages. However, in a current display device, a divergence angle of light emitted from a display screen has a large angular range, and only light in a small angular range may be observed by human eyes, resulting in low light utilization efficiency. Under some application scenarios, a user may carry out a peep-proof treatment on the display screen in order to protect personal privacy. A conventional peep-proof treatment includes attaching a layer of peep-proof film on a surface of the display screen, and the peep-proof film may cause waste of the utilization efficiency of light. Compared with the TFT-LCD or the like, a reflective display device with a directional function may achieve higher light utilization efficiency and has a better application prospect.

SUMMARY

An aspect of the present disclosure provides a display device including: a liquid crystal layer having a first surface and a second surface opposite to each other, the second surface including a light entrance region and a light outgoing region; a reflector within the liquid crystal layer and adjacent to the first surface; and a light absorbing layer on the first surface of the liquid crystal layer, wherein the light absorbing layer includes a first shielding layer, a second shielding layer and a filling layer between the first shielding layer and the second shielding layer; and the second shielding layer is between the first shielding layer and the liquid crystal layer, and has a first opening therein. The liquid crystal layer is configured to modulate light incident from the light entrance region into first refracted light under a first voltage, wherein the first refracted light is incident from the first opening into the filling layer and reflected between the first shielding layer and the second shielding layer, and modulate the light incident from the light entrance region into second refracted light under a second voltage different from the first voltage, wherein the second refracted light is directed to the reflector, reflected by the reflector and exits from the light outgoing region.

According to an embodiment of the present disclosure, the filling layer has a refractive index equal to a first equivalent refractive index of the liquid crystal layer under the first voltage.

According to an embodiment of the present disclosure, a distance h between the first shielding layer and the second shielding layer, a width d of the first opening in a direction from the light entrance region to the light outgoing region satisfy the following equation: $2*h*\tan(\theta) > d$, where $\theta$ is an angle between light incident into the filling layer and a thickness direction of the filling layer.

According to an embodiment of the present disclosure, the filling layer has a refractive index of 1.6 to 2.0.

According to an embodiment of the present disclosure, the filling layer is a transparent film layer.

According to an embodiment of the present disclosure, the display device further includes a backlight module on a side of the liquid crystal layer facing away from the light absorbing layer, and the backlight module is configured to emit light into the light entrance region of the liquid crystal layer and transmit light exiting from the light outgoing region of the liquid crystal layer.

According to an embodiment of the present disclosure, the display device further includes a third shielding layer between the liquid crystal layer and the backlight module, and the third shielding layer includes a second opening for exposing the light entrance region and a third opening for exposing the light outgoing region.

According to an embodiment of the present disclosure, the backlight module includes a light guide plate, a light source component and an optical film layer, the optical film layer is between the light guide plate and the liquid crystal layer, and has a fourth opening therein; the fourth opening is in communication with the second opening and is configured to expose the light entrance region, and the optical film layer has a refractive index smaller than a refractive index of the light guide plate, and the light source component is on a side surface of the light guide plate and configured to emit a collimated polarized light towards the side surface of the light guide plate, so that light entering into the light guide plate is totally reflected within the light guide plate, then exits from the fourth opening and enters into the light entrance region.

According to an embodiment of the present disclosure, the collimated polarized light emitted by the light source component toward the side surface of the light guide plate has an incident angle between 70° and 80°.

According to an embodiment of the present disclosure, the reflector is a reflective prism having a reflecting surface inclined with respect to the first surface.

According to an embodiment of the present disclosure, a first equivalent refractive index of the liquid crystal layer under the first voltage is greater than a second equivalent refractive index of the liquid crystal layer under the second voltage.

According to an embodiment of the present disclosure, the display device has a plurality of pixel units, and each pixel unit includes the light entrance region and the light outgoing region.

According to an embodiment of the present disclosure, the display device includes a driving electrode layer on at least one side of the liquid crystal layer for providing a driving electric field to the liquid crystal layer.

According to an embodiment of the present disclosure, the driving electrode layer includes a first electrode layer and a second electrode layer; the first electrode layer is on a side of the light absorbing layer facing away from the liquid crystal layer, and the second electrode layer is on a side of the liquid crystal layer facing away from the light absorbing layer.

BRIEF DESCRIPTION OF THE DRAWINGS

The accompanying drawings, which constitute a part of the specification, are included to provide a further understanding of the present disclosure and explain the present disclosure together with the following specific embodiments, but do not constitute a limitation to the present disclosure. In the accompanying drawings.

DETAILED DESCRIPTION

The specific embodiments of the present disclosure will be described in detail with reference to the accompanying drawings. It should be understood that the specific embodiments described herein are only used to illustrate and explain the present disclosure, and are not used to limit the present disclosure.

Unless otherwise defined, technical or scientific terms used in the embodiments of the present disclosure should have ordinary meaning as understood by one of ordinary skill in the art to which the present disclosure belongs. "First," "second," or a similar term used in the present disclosure is not intended to indicate any order, quantity, or importance, but rather is used to distinguish one element from another. Similarly, "includes", "including" or a similar term, means that an element or item preceding the term includes an element or item listed after the term and its equivalent, but does not exclude other elements or items. Terms "connected", "coupled" or a similar term is not limited to a physical or mechanical connection, but may include an electrical connection, whether in a direct manner or an indirect manner. Terms "upper", "lower", "left", "right", and the like are used only to indicate relative positional relationships, and when an absolute position of an object being described is changed, the relative positional relationships may also be changed accordingly.

Figure 1:
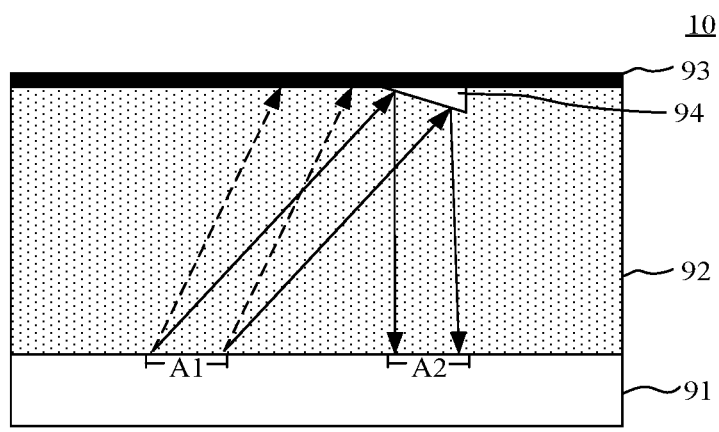
FIG. 1 is an operating principle diagram of a reflective display device.

FIG. 1 is an operating principle diagram of a reflective display device. As shown in FIG. 1, when a pixel in a reflective display device 10 is in a bright state, light emitted from a backlight module 91 (shown by solid arrows in FIG. 1) enters into a liquid crystal layer 92 from a light entrance region A1, is deflected by the liquid crystal layer 92 to arrive on a reflector 94, is reflected by the reflector 94, and then exits from a light outgoing region A2. When the pixel in the reflective display device 10 is in a dark state, light (indicated by dotted arrows in FIG. 1) emitted from the backlight module 91 enters into the liquid crystal layer 92 from the light entrance region A1, and then is deflected by the liquid crystal layer 92 to arrive on a black matrix layer 93, so that the light cannot exit from the light outgoing region A2. However, since some media (such as the black matrix layer) in the reflective display device have a certain reflectivity, when the pixel in the reflective display device 10 is in the dark state, the light emitted from the backlight module 91 will be reflected in the liquid crystal layer 92, and the reflected light may be exit from the light outgoing region A2 once the reflected light is irradiated on the reflector 94, which may cause light leakage of the display device, thereby affecting a contrast performance.

Figure 2:
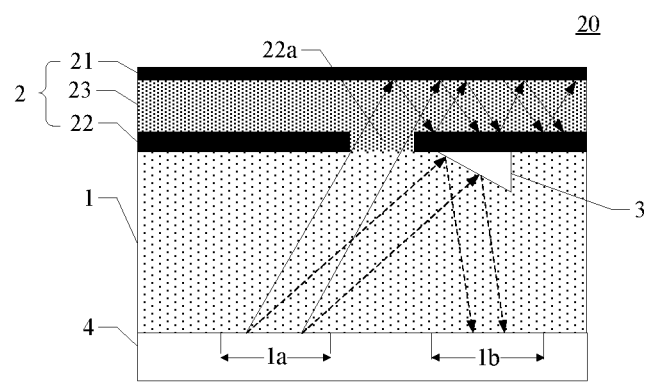
FIG. 2 is a schematic structural diagram of a display device according to an embodiment of the present disclosure.

FIG. 2 is a schematic structural diagram of a display device according to an embodiment of the present disclosure. Hereinafter, one pixel unit in the display device is taken as an example for explanation.

As shown in FIG. 2, the display device 20 includes a liquid crystal layer 1, a light absorbing layer 2 disposed on a first surface of the liquid crystal layer 1, and a backlight module 4 disposed on a second surface of the liquid crystal layer 1 opposite to the first surface thereof. The second surface of the liquid crystal layer 1 is provided with a light entrance region 1a and a light outgoing region 1b, which are located on a side of the liquid crystal layer 1 facing away from the light absorbing layer 2; and a reflector 3 is disposed on a side of the liquid crystal layer 1 proximal to the light absorbing layer 2 and in the liquid crystal layer 1. The light absorbing layer 2 includes a first shielding layer 21, a second shielding layer 22, and a filling layer 23 positioned between the first shielding layer 21 and the second shielding layer 22; the second shielding layer 22 is positioned between the first shielding layer 21 and the liquid crystal layer 1, and the second shielding layer 22 is provided with a first opening 22a. The liquid crystal layer 1 makes a pixel in a dark state under a first voltage, and at this time, the liquid crystal layer 1 modulates light incident from the light entrance region 1a into first refracted light (as indicated by solid arrows in FIG. 2), and the first refracted light enters into the filling layer 23 from the first opening 22a and is reflected between the first shielding layer 21 and the second shielding layer 22.

As shown in FIG. 2, the light entrance region 1a is disposed on a left side of the liquid crystal layer 1; the light outgoing region 1b is disposed on a right side of the liquid crystal layer 1; the reflector 3 is disposed on the right side of the liquid crystal layer 1 and above the light outgoing region 1b; the first opening 22a is disposed on a left side of the reflector 3 and exposes the filling layer 23; and the exposed filling layer 23 is in contact with the liquid crystal layer 1. In an embodiment of the present disclosure, when the liquid crystal layer 1 is under the action of the first voltage such that the pixel is in the dark state, the liquid crystal layer 1 has a first equivalent refractive index to modulate the light incident from the light entrance region 1a into the first refracted light, wherein the first equivalent refractive index may be 1.8. The filling layer 23 may have a refractive index close to (e.g., equal to) the first refractive index so that the first refracted light may be incident into the filling layer 23 from the liquid crystal layer 1.

In an embodiment of the present disclosure, the first shielding layer 21 and the second shielding layer 22 may adopt a material having a low reflectance. As shown in FIG. 2, the first refracted light entering into the filling layer 23 is reflected between the first shielding layer 21 and the second shielding layer 22 many times, and a part of the light is absorbed by the first shielding layer 21 or the second shielding layer 22 in each reflection, so that an energy of the first refracted light is gradually attenuated and finally absorbed by the first shielding layer 21 and the second shielding layer 22. Therefore, in the display device according to the embodiment of the present disclosure, when the pixel is in the dark state, the light incident into the liquid crystal layer 1 from the light entrance region 1a may enter into the light absorbing layer 2 without being reflected in the liquid crystal layer 1, thereby reducing a light leakage in the dark state.

As shown in FIG. 2, the liquid crystal layer 1 also makes the pixel in the display device in a bright state under a second voltage different from the first voltage, and at this time, the liquid crystal layer 1 modulates the light incident from the light entrance region 1a into second refracted light (as shown by dotted arrows in FIG. 2), and the second refracted light is incident on the reflector 3 and is reflected by the reflector 3 toward the light outgoing region 1b. The reflector 3 is provided inside the liquid crystal layer 1 at a position where the reflector 3 may reflect the second refracted light.

In an embodiment of the present disclosure, the reflector 3 is a reflective prism having a reflective surface inclined with respect to the second shielding layer 22 (i.e., the first surface of the liquid crystal layer 1) for reflecting the second refracted light. A material of the reflective prism may include a metal, or a surface of the reflective prism may be coated with a metal layer. A cross section of the reflective prism in a direction parallel to a paper of the FIG. 2 may be a triangular shape.

When the pixel is in the bright state, rotation angles of liquid crystals may be controlled such that the liquid crystal layer 1 has a second equivalent refractive index, so that the second refracted light is deflected to the right side to a greater extent than the light incident from the light entrance region 1a, and further irradiates on the reflector 3, and then is reflected to the light outgoing region 1b by the reflector 3. When the pixel is in the dark state, the rotation angles of the liquid crystals may be controlled such that the liquid crystal layer 1 has the first equivalent refractive index, so that the first refracted light may be deflected to the left side to a greater extent than the light incident from the light entrance region 1a, and the first refracted light may enter into the filling layer 23 exposed by the first opening 22a. The first equivalent refractive index of the liquid crystal layer 1 is larger than the second equivalent refractive index thereof. The equivalent refractive index of the liquid crystal layer 1 means a refractive index exhibited by the entire liquid crystal layer under a certain voltage.

In some embodiments, the refractive index of the filling layer 23 may be set between 1.6 and 2.0. In an embodiment of the present disclosure, the refractive index of the filling layer 23 and the first equivalent refractive index are equal to each other. For example, the refractive index of the filling layer 23 is 1.8, and the filling layer 23 may be made of OC, resin, or another material.

In some embodiments, the filling layer 23 is a transparent film layer, thereby facilitating the display device to realize a transparent display. In an embodiment of the present disclosure, the transparent film layer means that the film layer may transmit at least 50% (e.g., at least 60%, at least 70%, at least 80%, at least 90%, or at least 95%) of incident light in a visible wavelength range.

Figure 3:
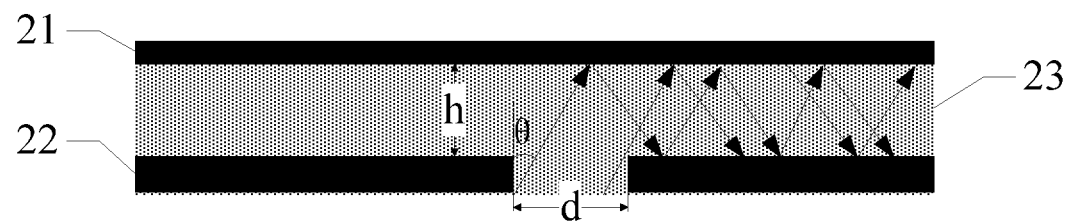
FIG. 3 is a schematic structural diagram of a light absorbing layer according to an embodiment of the present disclosure.

FIG. 3 is a schematic structural diagram of a light absorbing layer according to an embodiment of the present disclosure. As shown in FIG. 3, a distance h between the first shielding layer 21 and the second shielding layer 22 and a width d of the first opening 22a satisfy the following equality:

$$2*h*\tan(\theta)>d$$

Where θ is an angle between the light incident into the filling layer 23 and a thickness direction of the filling layer 23. It should be noted that, in an embodiment of the present disclosure, the width d of the first opening 22a may refer to a size of the first opening 22a along an arrangement direction from the light entrance region 1a to the light outgoing region 1b.

Figure 4:
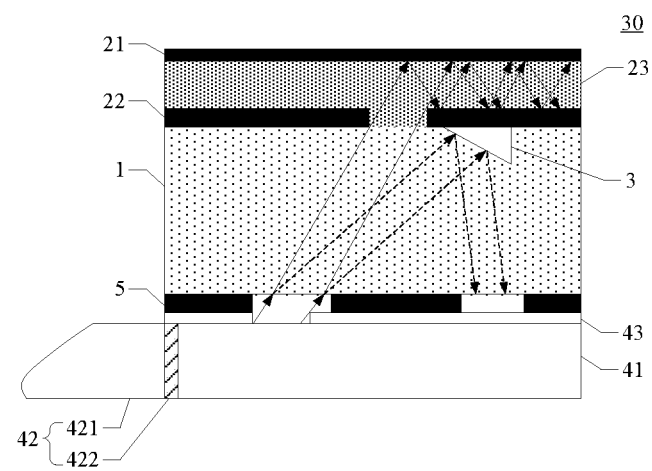
FIG. 4 is a schematic structural diagram of a display device according to another embodiment of the present disclosure.
Figure 5:
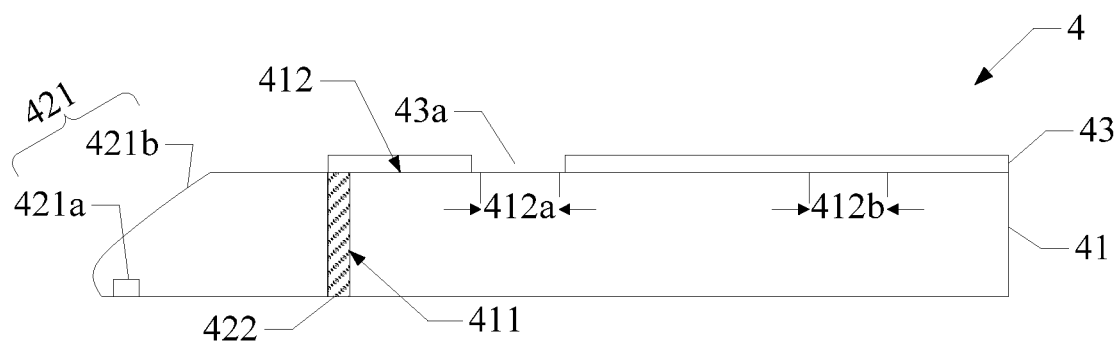
FIG. 5 is a schematic structural diagram of a backlight module according to an embodiment of the present disclosure.

FIG. 4 is a schematic structural diagram of a display device according to another embodiment of the present disclosure, and FIG. 5 is a schematic structural diagram of a backlight module according to an embodiment of the present disclosure. As shown in FIGS. 4 and 5, the display device 30 further includes a backlight module 4; the backlight module 4 is disposed on a side of the liquid crystal layer 1 facing away from the light absorbing layer 2, and is configured to emit light into the light entrance region 1a of the liquid crystal layer 1 and transmit the light emitted from the light outgoing region 1b of the liquid crystal layer 1. The display device 30 shown in FIG. 4 has the same structure as the display device 20 shown in FIG. 2, and a description thereof will not be repeated here.

Referring to FIGS. 4 and 5, the backlight module 4 includes a light guide plate 41, a light source component 42, and an optical film layer 43. The light guide plate 41 has a first surface 411 and a second surface 412 facing the liquid crystal layer 1. The first surface 411 is a side surface of the light guide plate 41. The second surface 412 includes a first region 412a and a second region 412b, the first region 412a is opposite to the light entrance region 1a of the liquid crystal layer 1, and the second region 412b is configured to receive the light emitted from the light outgoing region 1b of the liquid crystal layer 1. The optical film layer 43 is disposed on the second surface 412 of the light guide plate 41 and is provided with a second opening 43a which exposes the first region 412a. A refractive index of the optical film layer 43 is smaller than that of the light guide plate 41. For example, the refractive index of the light guide plate 41 may be between 1.2 and 1.5, for example, 1.5, and the refractive index of the optical film layer 43 is less than 1.3, for example, 1.2. The light source component 42 is disposed opposite to the first surface 411, and configured to emit collimated polarized light toward the first surface 411, so that light entering into the light guide plate 41 is totally reflected in the light guide plate 41, and then exits from the first region 412a, and enters into the corresponding light entrance region 1a.

Since the refractive index of the optical film layer 43 is smaller than that of the light guide plate 41, an incident angle of the collimated polarized light may be larger than a critical angle for total reflection at an interface between the optical film layer 43 and the light guide plate 41, so that the light entered into the light guide plate 41 is totally reflected in the light guide plate 41 and enters into the liquid crystal layer 1 when the light reaches the second opening 43a. The second opening 43a may be filled with a filling material having a refractive index close to that of the light guide plate 41, so that the light totally reflected and propagated in the light guide plate 41 may enter into the liquid crystal layer 1 from the first region 412a.

Since the second opening 43a is a small slit, the light is diffracted when passing through the second opening 43a, and an intensity of the diffracted light may be calculated by the equation: $I=I_0*(\sin \alpha/\alpha)^2$, where $I_0$ is an intensity of a central bright-fringe light and $\alpha$ is a phase difference between an edge light and the central light at a single slit, which increases with an increase of an equivalent width of the slit.

Figure 6:
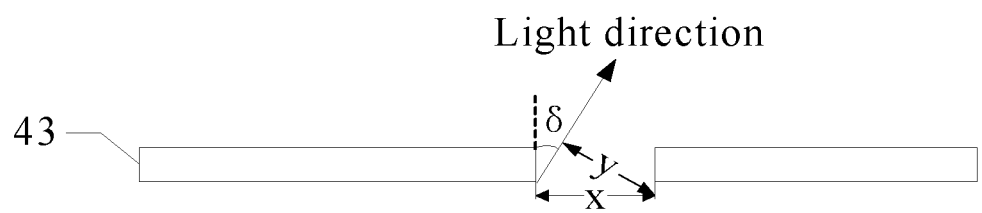
FIG. 6 is a schematic diagram of an equivalent width of a slit according to an embodiment of the present disclosure.
Figure 7:
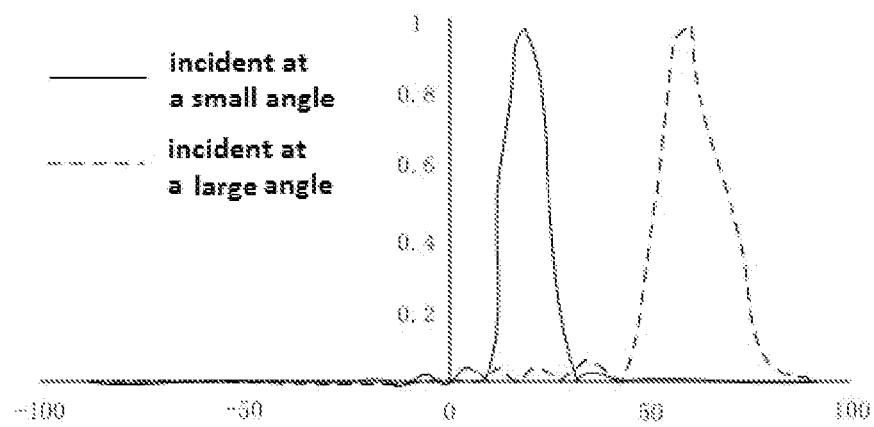
FIG. 7 is an angular spectrum of light when diffracting according to an embodiment of the present disclosure.

FIG. 6 is a schematic diagram of an equivalent width of a slit according to an embodiment of the present disclosure. As shown in FIG. 6, the equivalent width $y=x*\cos(\delta)$, where x is a width of the slit, and $\delta$ is an angle between the light incident into the liquid crystal layer 1 and a thickness direction of the optical film layer 43. FIG. 7 is an angular spectrum of light when diffracting according to an embodiment of the present disclosure. As shown in FIG. 7, a horizontal axis represents an angle, a vertical axis represents a normalized energy intensity, a solid line represents a variation curve of the normalized energy intensity when the light is incident at a small angle, and a dotted line represents a variation curve of the normalized energy intensity when the light is incident at a large angle. When the normalized energy is greater than 0, it means that the light is diffracted. As can be seen from FIG. 7, when the light is incident at the small angle, a diffraction angle range is small, and a diffraction phenomenon is weak; and when the light is incident at the large angle, the diffraction angle range is large, and the diffraction phenomenon is significant. Therefore, in an embodiment of the present disclosure, an incident angle of the collimated polarized light emitted by the light source component 42 toward the first surface 411 may be 75°±5°, so that the diffracted light of the light incident into the second opening 43a may satisfy an actual requirement.

In some embodiments, as shown in FIG. 5, the light source component 42 includes a collimated light source 421 and a polarizing plate 422; the collimated light source 421 is configured to emit collimated light toward the polarizing plate 422; the polarizing plate 422 is positioned between the first surface 411 of the light guide plate 41 and the collimated light source 421. The collimated light source 421 may include a light emitting member 421a (such as an LED) and a lamp cover 421b, and the lamp cover 421b is configured to reflect divergent light from the light emitting member 421a to form the collimated light. In an embodiment of the present disclosure, a corresponding polarizing plate may be selected according to actual needs, so that the light emitted from the collimated light source 421 may be incident into the light guide plate 41 in a predetermined polarization direction.

Figure 8:
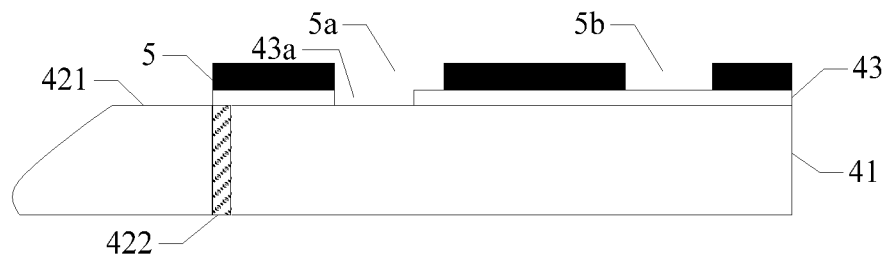
FIG. 8 is a schematic diagram of disposing a third shielding layer on a backlight module according to an embodiment of the present disclosure.

FIG. 8 is a schematic diagram of providing a third shielding layer on a backlight module according to an embodiment of the present disclosure. As shown in FIGS. 4 and 8, a third shielding layer 5 is further provided between the optical film layer 43 and the liquid crystal layer 1; a third opening 5a is provided at a position of the third shielding layer 5 corresponding to the light entrance region 1a; a third opening 5b is provided at a position of the third shielding layer 5 corresponding to the light outgoing region 1b; and the third opening 5a is in communication with the second opening 43a. Since the third shielding layer 5 is disposed between the optical film layer 43 and the liquid crystal layer 1, the third shielding layer 5 may prevent light incident laterally into the optical film layer 43 from being incident into the liquid crystal layer 1; meanwhile, it is also possible to prevent external environmental light propagating in a direction from the optical film layer 43 to the liquid crystal layer 1 from entering into the liquid crystal layer 1. Besides, the third opening 5b corresponding to the light outgoing region 1b may also restrict a light outgoing range. The third shielding layer 5 may be used to define the light entrance region 1a and the light outgoing region 1b of the liquid crystal layer 1.

In some embodiments, the display device has a plurality of pixel units, which may be arranged in a plurality of rows and a plurality of columns; and each pixel unit includes the light entrance region 1a and the light outgoing region 1b.

Figure 9:
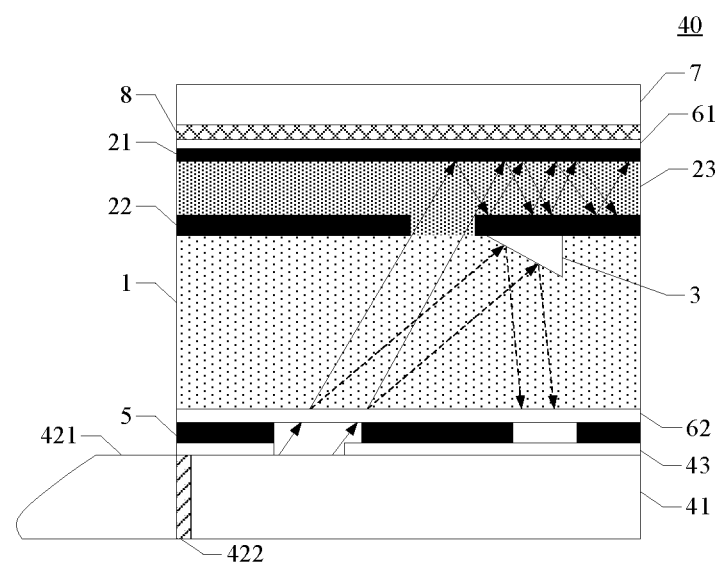
FIG. 9 is a schematic structural diagram of a display device according to another embodiment of the present disclosure.

FIG. 9 is a schematic structural diagram of a display device according to another embodiment of the present disclosure. The display device 40 shown in FIG. 9 has the same structure as the display devices 20, 30 shown in FIGS. 2 and 4, and a description thereof will not be repeated here.

As shown in FIG. 9, the display device 40 further includes a driving electrode layer on at least one side of the liquid crystal layer 1 for providing a driving electric field to the liquid crystal layer 1. For example, when the pixel is in the dark state, the driving electrode layer may provide a high voltage driving signal to the liquid crystal layer 1, so that the liquid crystal layer 1 has a larger equivalent refractive index; and when the pixel is in the bright state, the driving electrode layer may provide a low voltage driving signal to the liquid crystal layer 1, so that the liquid crystal layer 1 has a smaller equivalent refractive index. The driving electrode layer includes a first electrode layer 61 and a second electrode layer 62, and the first electrode layer 61 and the second electrode layer 62 may be disposed on the same side of the liquid crystal layer 1 or disposed on different sides of the liquid crystal layer 1.

In an embodiment of the present disclosure, the display device may further include a substrate 7 and a thin film transistor 8 disposed in each pixel unit, and the thin film transistor 8 is disposed between the substrate 7 and the light absorbing layer 2. The first electrode layer 61 may be a pixel electrode layer including a plurality of pixel electrodes, and the second electrode layer 62 may be a common electrode layer. When the first electrode layer 61 and the second electrode layer 62 are disposed on different sides of the liquid crystal layer 1, the first electrode layer 61 is located between the thin film transistor 8 and the light absorbing layer 2, the second electrode layer 62 is located on a side of the liquid crystal layer 1 facing away from the light absorbing layer 2, and the third shielding layer 5 is disposed between the backlight module 4 and the second electrode layer 62. When the first electrode layer 61 and the second electrode layer 62 are located on the same side of the liquid crystal layer 1, the second electrode layer 62 may be disposed between the thin film transistor 8 and the substrate 7, or the second electrode layer 62 may be disposed as a plurality of electrode bar structures, and the plurality of electrode bar structures of the second electrode layer 62 and the plurality of pixel electrodes of the first electrode layer 61 are disposed in the same layer and at intervals.

In summary, the display device according to the embodiments of the present disclosure can obviously improve a light transmission when the pixel is in the dark state while ensuring that the display device has good transmittance, thereby improving a brightness-dark contrast of the display device and enhancing a displaying effect.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

The invention claimed is:

1. A display device, comprising:
a liquid crystal layer having a first surface and a second surface opposite to each other, wherein the second surface comprises a light entrance region and a light outgoing region;
a reflector within the liquid crystal layer and adjacent to the first surface; and
a light absorbing layer on the first surface of the liquid crystal layer, wherein the light absorbing layer comprises a first shielding layer, a second shielding layer and a filling layer between the first shielding layer and the second shielding layer; and the second shielding layer is between the first shielding layer and the liquid crystal layer, and has a first opening therein,
wherein the liquid crystal layer is configured to:
modulate light incident from the light entrance region into first refracted light under a first voltage, wherein the first refracted light is incident from the first opening into the filling layer and reflected between the first shielding layer and the second shielding layer, and
modulate the light incident from the light entrance region into second refracted light under a second voltage different from the first voltage, wherein the second refracted light is directed to the reflector, reflected by the reflector and exits from the light outgoing region.

2. The display device of claim 1, wherein the filling layer has a refractive index equal to a first equivalent refractive index of the liquid crystal layer under the first voltage.

3. The display device of claim 2, wherein the filling layer has a refractive index in a range of 1.6 to 2.0.

4. The display device of claim 1, wherein a distance h between the first shielding layer and the second shielding layer, a width d of the first opening in a direction from the light entrance region to the light outgoing region satisfy the following equation:

$2*h*\tan(\theta)>d$, where θ is an angle between light incident into the filling layer and a thickness direction of the filling layer.

5. The display device of claim 1, wherein the filling layer is a transparent film layer.

6. The display device of claim 1, further comprising a backlight module on a side of the liquid crystal layer facing away from the light absorbing layer, wherein the backlight module is configured to emit light into the light entrance region of the liquid crystal layer and transmit light exiting from the light outgoing region of the liquid crystal layer.

7. The display device of claim 6, further comprising a third shielding layer between the liquid crystal layer and the backlight module, wherein the third shielding layer comprises a second opening for exposing the light entrance region and a third opening for exposing the light outgoing region.

8. The display device of claim 7, wherein the backlight module comprises a light guide plate, a light source component and an optical film layer,
the optical film layer is between the light guide plate and the liquid crystal layer, and has a fourth opening therein; the fourth opening is in communication with the second opening and is configured to expose the light entrance region, and the optical film layer has a refractive index smaller than a refractive index of the light guide plate, and
the light source component is on a side surface of the light guide plate and configured to emit a collimated polarized light towards the side surface of the light guide plate, so that light entering into the light guide plate is totally reflected within the light guide plate, then exits from the fourth opening and enters into the light entrance region.

9. The display device of claim 8, wherein the collimated polarized light emitted by the light source component toward the side surface of the light guide plate has an incident angle between 70° and 80°.

10. The display device of claim 1, wherein the reflector is a reflective prism having a reflecting surface inclined with respect to the first surface.

11. The display device of claim 1, wherein a first equivalent refractive index of the liquid crystal layer under the first voltage is greater than a second equivalent refractive index of the liquid crystal layer under the second voltage.

12. The display device of claim 1, wherein the display device has a plurality of pixel units, and each pixel unit comprises the light entrance region and the light outgoing region.

13. The display device of claim 1, further comprising a driving electrode layer on at least one side of the liquid crystal layer for providing a driving electric field to the liquid crystal layer.

14. The display device of claim 13, wherein the driving electrode layer comprises a first electrode layer and a second electrode layer; the first electrode layer is on a side of the light absorbing layer facing away from the liquid crystal layer, and the second electrode layer is on a side of the liquid crystal layer facing away from the light absorbing layer.

* * * * *